United States Patent [19]
Japikse et al.

[11] Patent Number: 4,693,905
[45] Date of Patent: * Sep. 15, 1987

[54] ORANGE FLAVOR AND AROMA COMPOSITIONS MADE BY DENSE GAS EXTRACTION OF ORGANIC ORGANCE FLAVOR AND AROMA COMPOUNDS

[75] Inventors: Cornelis H. Japikse; Lester P. Van Brocklin, both of Wyoming; Johnny A. Hembree; Ralph R. Kitts, both of Fairfield; Donald R. Meece, Norwood, all of Ohio

[73] Assignee: The Procter & Gamble Company, Cincinnati, Ohio

[*] Notice: The portion of the term of this patent subsequent to Mar. 3, 2004 has been disclaimed.

[21] Appl. No.: 746,608

[22] Filed: Jun. 19, 1985

[51] Int. Cl.$^4$ .............................................. A23L 2/02
[52] U.S. Cl. ...................................... 426/599; 426/387
[58] Field of Search ............... 426/590, 534, 599, 616, 426/650, 651, 386, 387, 333

[56] References Cited

U.S. PATENT DOCUMENTS

| | | |
|---|---|---|
| 3,477,856 | 11/1969 | Schultz . |
| 4,374,865 | 2/1983 | Strobel ................................ 426/384 |
| 4,463,025 | 7/1984 | Strobel ................................ 426/384 |

FOREIGN PATENT DOCUMENTS

| | | | |
|---|---|---|---|
| 0044747 | 1/1982 | European Pat. Off. ............ | 426/599 |
| 0110638 | 5/1984 | European Pat. Off. ............ | 426/599 |

OTHER PUBLICATIONS

Gerard, "Continuous Terpene Removal from Essential Oils by Countercurrent Extraction with Compressed Carbondioxide", Chem.-Ing.-Tech. 56 (1984), No. 10, pp. 794–795.

Chemical Engineering Dec. 10, 1984, p. 18.
Schultz & Randall, "Liquid Carbon Dioxide for Selective Aroma Extraction", Food Technology, vol. 24, pp. 1281–1286 (1970).
Schultz et al., "Pilot Plant Extraction with Liquid $CO_2$", Food Technology, vol. 28, No. 6, pp. 32–36, 88 (1984).
Brogle, "$CO_2$ as a Solvent: Its Properties and Applications", Chemistry and Industry, Jun. 19, 1982, pp. 385–390.

Primary Examiner—Raymond N. Jones
Assistant Examiner—Carolyn Paden
Attorney, Agent, or Firm—Gary M. Sutter; Rose Ann Dabek; Richard C. Witte

[57] ABSTRACT

The present invention is concentrated orange flavor and aroma compositions prepared by the extraction of organic orange flavor and aroma compounds by a dense solvent gas. The compositions are characterized by high concentrations of ethyl butyrate (at least about 0.50%) and valencene (at least about 5%), and a low concentration of decanal (less than about 0.35%). They are prepared by a process comprising the steps of: (a) contacting organic orange flavor and aroma compounds with a solvent gas having a temperature between its critical temperature and about 100° C. (212° F.), and having a reduced pressure between about 0.56 and about 1.31, to extract flavor and aroma compounds the majority of which have a molecular weight less than or equal to that of limonene; (b) separating the solvent gas and dissolved compounds from the remaining undissolved compounds; and (c) separating the dissolved compounds from the solvent gas. The composition can be added to orange juice and orange beverages to enhance fresh orange flavor.

8 Claims, 5 Drawing Figures

ORANGE FLAVOR AND AROMA COMPOSITIONS MADE BY DENSE GAS EXTRACTION OF ORGANIC ORGANCE FLAVOR AND AROMA COMPOUNDS

FIELD OF INVENTION

The present invention relates to the production of concentrated orange flavor and aroma compositions prepared by the extraction of organic orange flavor and aroma compounds by a dense solvent gas. The compositions have a high concentration of desirable flavor and aroma compounds which are more volatile than limonene, and a low concentration of undesirable compounds. The invention further comprises the use of these compositions in orange juice and orange beverages.

BACKGROUND OF THE INVENTION

Consumers prefer the natural flavor of fresh handsqueezed orange juice. Freshly extracted orange juice is subjected to a concentration step to store and preserve the juice for year-round consumption. During concentration the sugar level is increased from about 10–15% to about 65%. At these high sugar levels, bacterial spoilage does not occur when the juice concentrate is preserved by cold storage. However, concentration processing techniques, such as evaporative concentration, can impair fresh flavor by removing desirable flavor and aroma volatiles and by creating undesirable thermal degradation flavors and aromas.

Evaporation removes water from fresh juice. The flavor and aroma compounds, which are primarily organic compounds, are removed with the vapor stream. The vapor stream condenses to a two-phase system. The water phase is referred to as "aqueous essence" and the oil phase is called "essence oil". Essence oil generally contains more of the higher molecular weight organics and typically is up to 95% limonene, whereas aqueous essence contains predominantly highly water soluble, low molecular weight alcohols (predominantly ethanol), aldehydes and esters. Adding these materials back to the concentrated juice improves its flavor, but the flavor often diminishes during storage.

The organic compounds believed to be primarily responsible for fresh valencia orange juice flavor are acetaldehyde, valencene, ethyl butyrate, neral and ethyl 3-hydroxyhexanoate. Compounds which are primarily found in orange peel are generally considered detrimental to fresh flavor but, in small amounts, provide an orange flavor. Degradation products such as decanal, alpha-terpineol, and d-carvone, and lipid oxidation products impart off-flavors to the juice.

It has now been found that fresh flavor compounds can be isolated from orange extracts by a special dense gas extraction without concentrating the off-flavor materials. Liquid carbon dioxide has been used to isolate organic compounds from flavor-containing materials. For example, U.S. Pat. No. 3,477,856 to Schultz describes extracting materials such as fruit juices and fruit essences with liquid carbon dioxide, separating the extract, and evaporating the carbon dioxide. Pressures between about 900 psig and 1000 psig and temperatures less than 31° C. (87° F.) are preferred. Schultz discloses that liquid carbon dioxide can totally dissolve esters, alcohols, ketones, and aldehydes up to a molecular weight of 150.

Schultz and Randall, "Liquid Carbon Dioxide for Selective Aroma Extraction", *Food Technology*, 24, 1281–86 (1970), discloses that liquid carbon dioxide is a selective solvent for the aroma constituents of fruits. Concentrated aroma constituents were extracted from orange juice with a single-stage apparatus at room temperature and 918 psig.

In Schultz et al., "Pilot Plant Extraction with Liquid $CO_2$", *Food Technology*, 28 No. 6, 32–36, 88 (1974), liquid carbon dioxide was found to be a solvent for esters, alcohols, aldehydes, and ketones, which are typically found in fruit essences. Extractability of a compound in liquid carbon dioxide was said to depend on its structure, molecular weight, and partition coefficient between water and liquid carbon dioxide.

Carbon dioxide in the supercritical state has also been used for related extractions. For example, Gerard, "Continuous Terpene Removal from Essential Oils by Countercurrent Extraction with Compressed Carbondioxide", *Chem.-Ing.-Tech.* 56 No. 10, 794–95 (1984), discloses the selective extraction of pineapple essential oils by supercritical carbon dioxide. Limonene was fractionated from carvone with carbon dioxide at a pressure of 1200 psi and a temperature between 70° C. (158° F.) and 100° C. (212° F.). In a model mixture, caryophyllen was said to be separable from anethole at pressures between 1280 psi and 1350 psi and a temperature of 40° C. (104° F.).

At a meeting of the American Institute of Chemical Engineers (Nov. 27, 1984), it was reported that Robey used supercritical carbon dioxide at 60° C. and 1600 psi to extract all the volatile components from lemon peel oil (95% limonene). Then the temperature was dropped at a constant pressure of 1600 psi to produce a mixture enriched in citral.

Lastly, in Brogle, "$CO_2$ as a Solvent: Its Properties and Applications", *Chemistry and Industry*, June 19, 1982, pp. 385–90, it is stated that given a range of compounds with comparable polarity, the volatility and solubility in a given solvent decrease with rising molecular weight. A model natural product was extracted with carbon dioxide until all material was dissolved. The first compounds extracted were the very volatile compounds, such as the components of essential oils, then compounds such as the heavier terpenes followed by the fatty oils, and finally waxes, resins, and pigments.

Gerard and Robey use supercritical carbon dioxide to separate limonene from carvone, caryophyllone from anethole, and citral from limonene. These compounds all have a molecular weight greater than that of limonene. By contrast, most of the desirable organic orange flavor and aroma compounds which contribute to freshtasting juice have molecular weights less than that of limonene.

It is an object of this invention to produce desirable orange flavor and aroma compositions by purifying or rectifying the mixture of orange organic flavor and aroma compounds so that most of the off-flavor contributors are removed and most of the positive fresh orange flavor and aroma contributing compounds are remaining.

It is another object of this invention to conduct the rectification and collection of positive orange flavor and aroma compounds by capturing the very low molecular weight, volatile materials in a high molecular weight mixture that is predominantly limonene and valencene. This mixture is further characterized in that it contains few or none of the off-flavor compounds, e.g. linalool, decanol, alpha-terpineol and nootkatone.

It is a particular object of this invention to produce orange flavor and aroma compositions that are characterized by high concentrations of ethyl butyrate and valencene, and a low concentration of decanal.

It is a further object of this invention to rectify the organic orange flavor and aroma compounds by extraction with a dense solvent gas.

It is another object of this invention to produce orange juice and orange beverages having a taste like fresh-squeezed juice by adding the extracted orange flavor and aroma compositions to a concentrated juice.

These and other objects of the invention will become evident from the disclosure herein.

All percentages are by weight unless otherwise defined.

SUMMARY OF THE INVENTION

The present invention is concentrated orange flavor and aroma compositions prepared by the extraction of organic orange flavor and aroma compounds by a dense solvent gas. The compositions are characterized by high concentrations of ethyl butyrate (at least about 0.50%) and valencene (at least about 5%), and a low concentration of decanal (less than about 0.35%). They are prepared by a process comprising the steps of: (a) contacting organic orange flavor and aroma compounds with a solvent gas having a temperature between its critical temperature and about 100° C. (212° F.), and having a reduced pressure between about 0.56 and about 1.31, to extract flavor and aroma compounds the majority of which have a molecular weight less than or equal to that of limonene; (b) separating the solvent gas and dissolved compounds from the remaining undissolved compounds; and (c) separating the dissolved compounds from the solvent gas. The invention further comprises the orange juice and orange beverages containing these compositions.

DETAILED DESCRIPTION OF THE INVENTION

Oranges contain juice as well as cellulose, juice sacs, membranes that separate juice sacs, seeds, peel fragments, pulp and other particulate material. A clear juice serum is obtained by separation of the juice from all the cellulosic and other materials. If such a serum is extracted from the fruit by careful cutting of the fruit followed by gentle squeezing, the juice will contain predominantly water, some color bodies (such as carotonoids), sugars, minerals, vitamins, a small amount of protein and many (several hundred) organic flavor and aroma compounds ranging in molecular weight from that of methanol (MW=32) to that of nootkatone (MW=218). Other organic flavor and aroma compounds are present in the peel, membrane, seeds and remaining components. Many of the organic compounds that are present in the peel, particularly in the outer orange layer which is commonly called the flavedo, and the white layer, the albedo, are bitter tasting. These compounds are undesirable at high levels in a juice, yet they are present in juices made by typical processing conditions.

Large amounts of oranges need to be mechanically extracted to provide juice in commercial quantities. This mechanical extraction is forceful and non-discriminating in the way it extracts juice from the orange. The resultant juice stream is normally heavily contaminated with materials derived from the peel components, seeds and membranes.

Many of the organic compounds found in the flavor and aroma profile of processed orange juice are not present to any extent in unprocessed juice. These compounds are either introduced during the extraction/finishing of the juice or through chemical reactions initiated following extraction of the juice. Limonene is a prime example of a compound introduced via extraction, as it originates predominantly in the flavedo. Limonin and other limonoids, bitter tasting compounds, come from the expression of pulp, rag and seeds during the finishing of the juice. Some compounds are formed via oxidation/degradation of materials originating in the peel and pulp. Fatty acids, for example, are generated through acid hydrolysis of pulp lipids. Oxidation to limonene to alpha-terpineol and d-carvone is a major source of off-flavors. Linalool, geraniol, nerol and alpha-terpineol can also be freed from their bound, glycosidic forms in the pulp.

It has now been surprisingly discovered that a mixture of desirable and undesirable organic orange flavor and aroma compounds can be converted by extraction with a dense solvent gas into orange flavor and aroma compositions highly concentrated in those organic compounds which contribute to the fresh flavor, e.g. ethanol, ethyl butyrate, acetaldehyde, and other alcohols, esters, and aldehydes having a molecular weight lower than that of limonene. At the same time, these compositions are virtually free of the higher molecular weight oxidation and decomposition compounds such as decanal, d-carvone, nootkatone and the bitter limonoids.

DEFINITIONS

By "organic orange flavor and aroma compounds" as used herein is meant all the organic compounds in oranges contributing to orange flavor and/or aroma. Oranges generally contain several hundred of such compounds.

By "solvent gas" herein is meant a compound which is gaseous at ambient temperatures and pressures (70° F., 20° C., 1 atmosphere). The solvent gas can be inorganic or organic, but it must not react with the aroma and flavor compounds in the orange material.

By "critical temperature and critical pressure" is meant the temperature and pressure above which the solvent gas cannot be condensed to a liquid.

By "dissolved compounds" are meant that organic compounds which are dissolved in or solubilized by the solvent gas during extraction. These compounds are removed with the solvent gas from the materials which are insoluble under the same conditions.

THE PRODUCT

Ethyl butyrate is a desirable orange flavor and aroma compound. The recovery of ethyl butyrate indicates that other desirable volatile materials have been retained. While not all of the highly volatile components have been identified, it is believed that many of them contribute to the fresh flavor. Decanal is an oxidation product of lipids. It along with other higher molecular weight alcohols and aldehydes contributes a green flavor or bitter note to the flavor. Therefore, its removal indicates that most undesirable components have been removed.

A preferred orange flavor and aroma composition according to the present invention is a composition having a high concentration of ethyl butyrate and a low concentration of decanal. At least about 0.50% of the composition should be ethyl butyrate and less than about 0.35% of the composition should be decanal. Preferably, at least about 0.65% and most preferably at least about 0.80% of the composition is ethyl butyrate. Preferably, less than about 0.30% of the composition is decanal, and most preferably the level of decanal will be less than about 0.20%.

Another characteristic of the preferred orange flavor and aroma compositions of this development is that they have a relatively high ratio of ethyl butyrate to limonene. The compositions have an ethyl butyrate to limonene ratio of from about 1:10 to about 1:100, and preferably from about 1:30 to about 1:100.

The preferred compositions are also high in valencene. The valencene fraction can either be used as a composition alone or in combination with the low molecular weight fraction. If used alone, a preferred composition has at least about 5% valencene and less than about 0.35% decanal. If combined in a composition with the low molecular weight fraction, the composition has at least about 5.0% valencene, at least about 0.50% ethyl butyrate, and less than about 0.35% decanal. Highly preferred compositions contain at least about 10% valencene.

Other preferred compositions according to the present development are high in acetaldehyde. As a percentage of the orange juice, orange juice concentrate or orange beverage, acetaldehyde should have a concentration of from about 0.0008% (8 ppm) to about 0.0015% (15 ppm), and preferably from about 0.0010% (10 ppm) to about 0.0012% (12 ppm).

While not a preferred way of making the compositions, both acetaldehyde and ethyl butyrate from another source can be added to the flavor concentrate.

The orange flavor and aroma compositions of the present development can be employed in a 100% orange juice or orange juice concentrate, or in an orange juice beverage containing other beverage ingredients besides orange juice. The orange juice concentrate will preferably have a solids content of at least about 35%, and more preferably between about 35% and about 65%. The orange flavor and aroma compositions are added to the orange juice, orange juice concentrate or orange beverage at an amount of from about 0.004% to about 0.016% by volume of the juice, juice concentrate (on a weight basis of juice reconstituted to 12% solids) or beverage.

The orange juice beverage can contain beverage ingredients such as water, sugar, artificial sweeteners, flavors, fruit juices, and mixtures thereof. Examples of other fruit juices to be used are other citrus juices, apple juice, pear juice, cranberry juice, pineapple juice, and grape juice. Other citrus juices include grapefruit juice, lemon juice, lime juice, tangerine juice, kumquat juice, and mixtures thereof. Mixtures of citrus juices can also be used, alone or with other juices, as in a citrus punch.

The orange flavor and aroma compositions can be used as a flavorant in other beverages, such as carbonated beverages, dry beverage mixes, and alcoholic beverages, and in candies, baked goods, and culinary mixes.

THE PROCESS

It was previously thought that the organic flavor and aroma compounds in orange juice were so similar in solubility and polarity that they could not be selectively extracted from one another by a solvent gas. It has now been found that under certain conditions of temperature and pressure, a dense solvent gas can be used to separate desirable organic orange flavor and aroma compounds from undesirable ones, based approximately on their molecular weight. At temperatures between 31° C. and about 100° C. and pressures between about 600 psig and about 1400 psig, a mixture of orange essence oil and carbon dioxide used to extract the essence oil was found to exist in two phases: a liquid phase consisting of a solution of some carbon dioxide in limonene and other oil components, and a dense gas phase consisting of some oil components in dense gas carbon dioxide. The oil components in the dense gas carbon dioxide were discovered to be enriched in the desirable low molecular weight organic flavor compounds relative to their concentration in the original essence oil. Hence, the two phases could be separated into two layers, and a flavor composition enriched in the desirable flavor and aroma compounds could be collected from the dense gas carbon dioxide.

The organic orange flavor and aroma compounds can be derived from any of a variety of oranges, e.g. Pineapple, Hamlin, Valencia, Parson Brown, or a combination thereof.

The organic orange flavor and aroma compounds most frequently found in orange juice can be measured by gas chromatography on a nonpolar gas chromatography column. The ascending order of retention time on the nonpolar chromatographic column generally corresponds to increasing molecular weight of the compounds, although slight differences in polarity can cause deviations. Table 1 lists some compounds found in orange juice in the order they elute from a gas chromatograph using a nonpolar substrate. It also indicates which compounds originate predominantly in the juice itself, which compounds originate predominantly in the peel, which compounds originate predominantly in the membranes and other cellulosic materials, and which compounds are decomposition or oxidation products. The contribution of a compound to the flavor and aroma of the juice is also listed. One or more "+"s indicates a positive or desirable flavor and aroma contribution; one or more "−"s indicates a negative or undesirable contribution. A "+/−" means the compound can impart either positive or negative flavor and aroma depending on its concentration.

TABLE 1

| Compound Name | Molecular Weight (Approx.) | Retention Time (Minutes)* | Relative Retention Order | Contribution to Flavor and Aroma (+ or −) | Principle Origin (Juice, Peel Membrane, or Decomposition) |
|---|---|---|---|---|---|
| Methanol | 32.0 | Not analyzed | — | — | Juice |
| Acetaldehyde | 44.1 | Not analyzed | — | +++ | Juice |
| Ethanol | 46.1 | Not analyzed | — | + | Juice |
| Ethyl Acetate | 60.1 | 3.6 | 1 | + | Juice |
| Ethyl Propionate | 102.1 | 7.0 | 2 | + | Juice |
| Methyl Butyrate | 102.1 | 7.6 | 3 | + | Juice |
| Hexanal | 100.2 | 13.4 | 5 | +/− | Membrane/peel |
| Ethyl Butyrate | 116.2 | 13.7 | 6 | +++ | Juice |
| Ethyl 3-Methyl-butyrate | 130.2 | 18.1 | 7 | + | Juice |
| Trans-2-Hexenal | 98.2 | 18.3 | 8 | −− | |
| A-pinene | 136.2 | 25.6 | 9 | + | Peel |
| B-pinene | 136.2 | 29.6 | 10 | +/− | Peel |
| Myrcene | 136.2 | 30.9 | 11 | +/l | Peel |
| Octanal | 128.2 | 32.1 | 12 | + | Peel |
| Limonene | 136.2 | 35.0 | 13 | + | Peel |
| G-Terpinene | 136.2 | 37.0 | 14 | − | Peel |
| Octanol | 130.2 | 38.0 | 15 | | Peel |
| Linalool | 154.2 | 40.6 | 16 | +/− | Juice/membrane/peel |
| Nonanal | 142.2 | 40.7 | 17 | + | Peel |
| Ethyl 3-Hydroxy-hexanoate | 160.2 | Not analyzed | — | ++ | Juice |
| Citronellal | 154.3 | 44.7 | 18 | +/− | Juice/peel |
| A-Terpineol | 154.3 | 47.7 | 19 | −−− | Decomposition |
| Decanal | 156.3 | 48.7 | 20 | −−− | Peel |
| Neral (Citral b) | 152.2 | 51.5 | 21 | ++ | Peel |
| D-Carvone | 150.2 | 51.8 | 22 | −− | Peel |
| Geraniol | 154.2 | 52.4 | 23 | | Juice/peel |
| Geranial (Citral a) | 152.2 | 53.7 | 24 | ++ | Peel |
| Perialdehyde | 160.2 | 54.1 | 25 | +/− | Peel |
| Dodecanal | 184.3 | 62.7 | 26 | +/− | Peel |
| B—Caryophyllene | 204.3 | 66.6 | 27 | | Juice |
| Valencene | 204.4 | 66.6 | 28 | +++ | Juice |
| Nootkatone | 218.0 | 75.0 | 29 | +/− | Peel |

*Retention times as measured by gas chromatography via a method explained hereinafter on a nonpolar DB-5 chromatographic column (J&W Scientific Inc., Rancho Cordova, Calif.).

The organic flavor and aroma compounds can be derived from any part of the orange. For example, they may be present in the juice, peel, rag, seed, or pulp. Therefore, the material to be extracted in the present process is any portion or extract of an orange. This includes aqueous essences; oils; essence oils; volatiles stripped from juice, pulp, peel, rag or seed using steam or inert gas; juice itself; juice extract; and pulverized peel, pulp or juice sacs. Conventional orange oils can be used. Typically, the starting material will be orange essence oil, collected from the vapor stream after evaporation or by steam stripping the juice. The examples herein use orange essence oil as the starting material; it is occasionally termed the "feed oil".

It is preferred that the starting material be in an anhydrous state, but some water can be present.

Steam stripping or solvent extraction of all the flavor and aroma materials from orange juice or orange materials can be used to obtain a starting orange mixture. Vacuum stripping of juice in a still with steam or inert gases such as nitrogen or carbon dioxide to capture a volatile fraction is another means of producing an organic orange flavor and aroma compound mixture. Cryogenic or inert gas blanketed condensation of volatiles released from orange during peeling, juice extraction, and finishing of the juice can also be used. Commercially available thermally folded orange essences can also be upgraded by the present extraction process to remove lipid oxidation products such as decanal and low boilers such as limonene degradation products.

Referring again to Table 1, what has been discovered is that the compounds with lower molecular weight near the top of the Table are more soluble in the dense gas phase than the compounds with higher molecular weight near the bottom of the Table. In a product extracted according to the present process, the relative concentration of the lower molecular weight compounds increases and the relative concentration of the higher molecular weight compounds decreases. Extraction pressures, temperatures and solvent to feed ratio can be chosen so that the extracted product will be highly enriched in desirable lower molecular weight compounds relative to the undesirable higher molecular weight compounds. For example, a very low solvent to feed ratio would produce an extracted product enriched primarily in methanol, acetaldehyde, ethanol and ethyl acetate.

Figure 2:
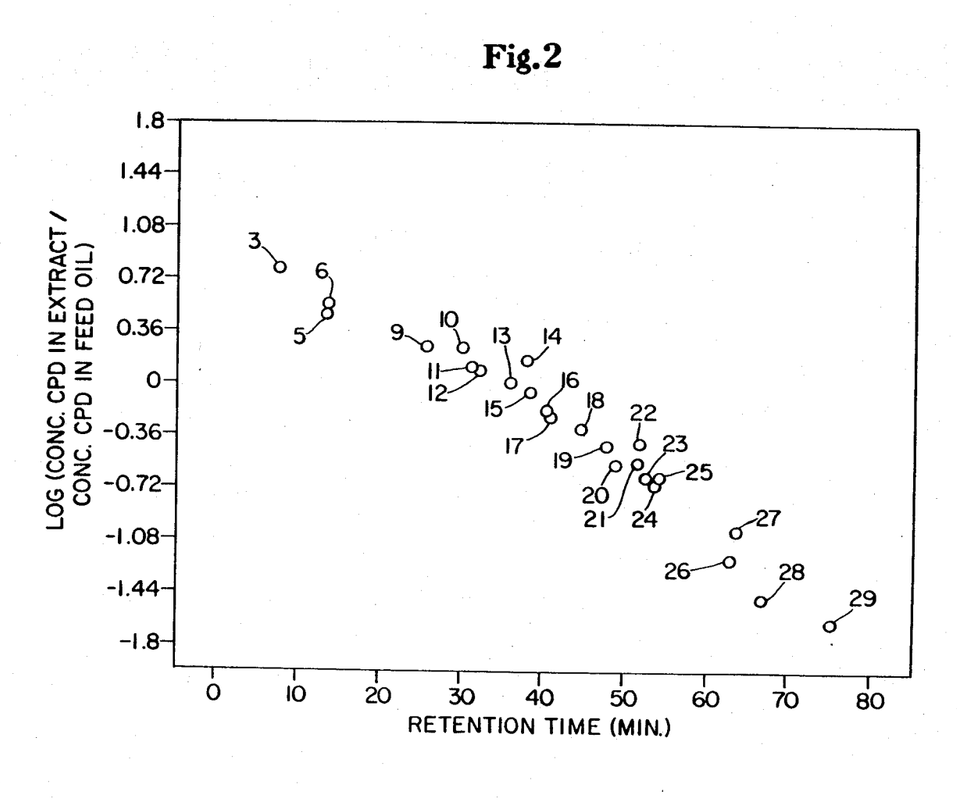
FIG. 2 is a plot showing the enhanced concentration of organic orange flavor and aroma compounds in the product of the process herein. Retention time on a gas chromatographic column is plotted against log (concentration of a compound in the extract divided by concentration of the compound in the feed oil).

FIG. 2 is a plot of the retention time of a compound on the DB-5 column (see description of the gas chromatograph process below) plotted against the log of the ratio of the concentration of a compound in the extract to the concentration of that compound in the starting material, in this case orange essence oil (referred to as "feed oil"). It is seen that the plot illustrates approximately a straight line relationship. Scatter from the line results from different functional groups, e.g. aldehydes, esters and alcohols, and the temperature programming used to separate the compounds. The low molecular weight compounds such as methyl butyrate (3) and ethyl butyrate (6) are higher in concentration in the extract than in the feed oil. The higher molecular weight compounds are lower in concentration in the extract than in the feed oil. The relationships are determined experimentally and then any desired fractionation can be performed by adjusting conditions such as temperature and pressure.

The slope of the relationship in FIG. 2 is a measure of selectivity in extraction, i.e. how much enrichment of low molecular weight materials can be accomplished in a single extraction. As pressure is increased toward the critical pressure of the mixture of compounds and solvent, the slope of the relationship approaches zero. Above about 1400 psig the slope is zero and selective extraction is no longer possible as all components are dissolved equally well.

The lower molecular weight compounds are more selectively solubilized in the dense gas phase at lower pressures. However, at too low a pressure there is not enough yield (total extraction). Increasing the temperature improves yield. However, the temperatures must be kept low enough to avoid oxidation from dissolved air in the feed and degradation of the orange compounds. It has been found to be suitable for the practice of this invention to extract with a solvent gas having a temperature between its critical temperature and about 100° C. (212° F.), and having a reduced pressure between about 0.56 and about 1.31. When the temperature is above about 100° C., too much thermal degradation of the sensitive organic orange flavor and aroma compounds occurs. Preferably, the temperature of the solvent gas should be between its critical temperature plus about 9° C. (16° F.) and about 70° C. (158° F.).

By "reduced pressure" of the solvent gas is meant the actual extraction pressure of the gas divided by its critical pressure. The solvent gas should have a reduced pressure between about 0.56 and about 1.31, and preferably between about 0.93 and about 1.12. Hence, the extraction pressure range for carbon dioxide is between about 600 psig and about 1400 psig, and the extraction pressure range for ethylene is between about 415 psig and about 975 psig.

Under these temperature and pressure conditions the gas exists as both a dense gas phase and a liquid. When carbon dioxide is used as the solvent gas, the temperature range is from about 31° C. (88° F.) to about 100° C. (212° F.) and the pressure range is from about 600 psig to about 1400 psig. The preferred temperature range for carbon dioxide is from about 40° C. (104° F.) to about 70° C. (158° F.), and the preferred pressure range is from about 1000 psig to abou 1200 psig. If the temperature and pressure of extraction is plotted as a rectangular area (see FIG. 1), there is an unworkable small corner of the rectangle consisting of the high part of the pressure range and the low part of the temperature range. Under these conditions too much of the gas dissolves into the feed so that there is only one phase present and the extraction does not work.

The weight ratio of the solvent gas to the material to be extracted is a significant parameter in the present process. This will be termed the "solvent to feed ratio". Lower weight ratios may be used with increasing density (thus increasing solvent power) of the gas, and with increasing efficiency of the extraction system. The solvent to feed ratio can vary between about 5:1 solvent:feed to about 100:1 solvent:feed. Preferably, the ratio is from about 10:1 to about 75:1, and more preferably the ratio is from about 30:1 to about 60:1.

Any conventional extraction equipment suitable for use with a dense gas or supercritical gas solvent can be used in carrying out the process of this invention. The equipment must include an extractor and a separator. The contact of the feed oil or orange extract with the solvent gas can be effected in a single extractor section or other piece of equipment which provides intimate fluid contact, or in two or more extractor sections or columns in a countercurrent process. The extractor generally used is a packed column or tray column. The packing is an inert material such as glass beads, glass wool, steel wool, clay, etc. Each extractor section can contain one or more equilibrium stages. Extraction is most conveniently carried out in a closed system. A continuous countercurrent multistage system is highly preferred for efficiency and large scale processing.

If desired, reflux can be used with the extraction system. After the extract is separated from the solvent gas, a certain percentage of the extract may be refluxed by returning it to the top extractor section. The percentage of reflux used depends on the type of extract that is desired. From about 0% to about 90% reflux is suitable, preferably from about 10% to about 75%, and most preferably from about 50% to about 75%. The low molecular weight or light compounds are more soluble in the solvent gas than the heavy (higher molecular weight) compounds. Reflux of the extract already concentrated in the light compounds displaces the heavier compounds in the upper extractor section and returns these heavier materials as an oil to the bottom section of the extractor. The resulting extract is even more concentrated in the low molecular weight compounds.

Extraction time, design of the apparatus, flow rate and flow volume are all interrelated. The highly preferred method of contacting the feed oil with the solvent gas is in a countercurrent extraction. Two or more extraction sections, each comprised of one or more stages, usually comprising one extraction column, can also be used in the process to increase the extract concentration. The number of stages can be increased by increasing the length of the column. Each section additionally concentrates the extract from the previous section. In a packed extraction column the number of equilibrium stages is determined by the height of the packing. The more stages that are used, the more concentrated the extract will be. Also, with more stages the extraction is more efficient, and thus a lower ratio of solvent gas to feed oil is needed. The batch extractor in FIG. 3 had one equilibrium stage, and a ratio of $CO_2$:feed oil of 72:1 was used. The two columns in the continuous system in FIG. 5 had respective heights of 40 inches for the top section and 20 inches for the bottom section. The top section had approximately three stages and the bottom represented five stages.

Any standard separation technique can be used to separate the dissolved compounds from the solvent gas in the present process. Separation is normally achieved by dropping the pressure of the solvent gas so that the dissolved compounds are no longer soluble in the gas.

A variety of compounds that are gases at ambient temperature can be used as the solvent gas for this process. The organic saturated or unsaturated hydrocarbons containing up to about three carbon atoms such as methane, ethane, ethylene, propane, and propylene can be used. Inorganic compounds such as carbon dioxide and nitrous oxide may also be used. Other gases include saturated or unsaturated halogenated hydrocarbons containing up to about three carbon atoms such as the fluorinated or chlorinated hydrocarbons. Carbon dioxide is a preferred solvent gas because it is inert, nonflammable, and nontoxic. Mixtures of gases may also be used. If mixtures are used the critical temperature and pressure referred to herein will be the critical temperature and pressure of the combined gas or gas mixture. For certain applications it may be necessary for the gas to be food compatible and/or government approved for use in foods or beverages.

Figure 1:
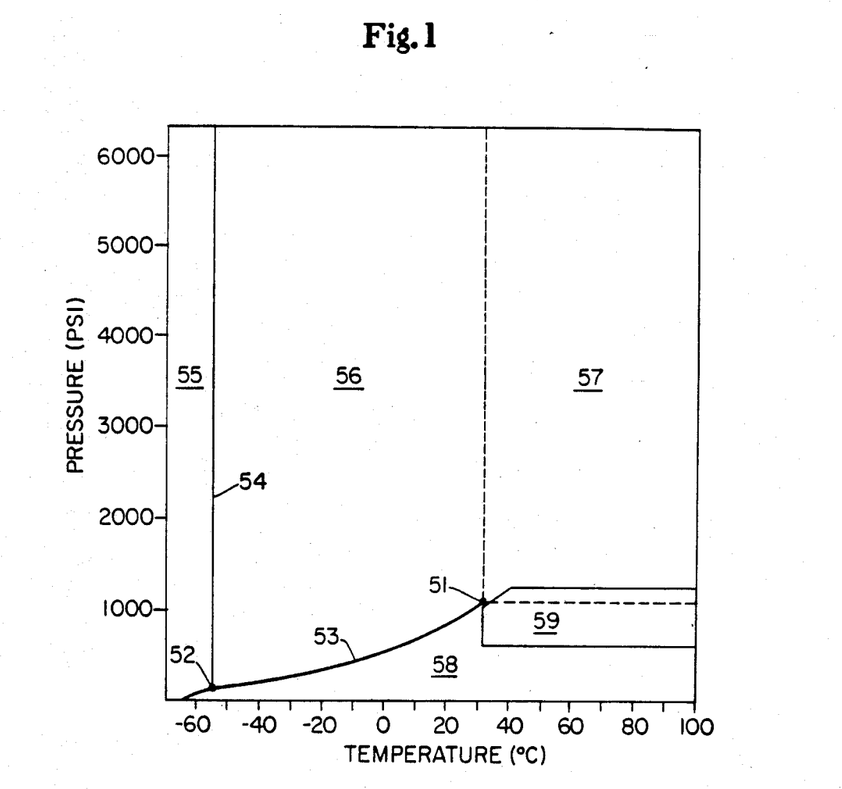
FIG. 1 is a temperature, pressure phase diagram of carbon dioxide. The area useful for extraction herein is denoted as area 59.

In FIG. 1 a phase diagram of carbon dioxide is illustrated. Point 51 is the critical point, where carbon dioxide is at both its critical temperature and critical pressure. Point 52 is carbon dioxide's triple point. Line 53 is the boiling line. Line 54 is the melting line. In area 55, bordered by lines 53 and 54, carbon dioxide is in the solid phase. In area 56, bordered by lines 53 and 54 and the vertical dotted line through the critical point, carbon dioxide exists in the liquid phase. In area 57, bordered by the vertical and horizontal dotted lines going to the critical point, carbon dioxide is in the supercritical fluid state. In area 58, bordered by line 53 and the horizontal dotted line, carbon dioxide is in the gaseous state.

Area 59, bordered by the solid lines, shows the area of extraction for the present process. The term "dense gas" is used herein to describe the state of the gas under the conditions of temperature and pressure used for extraction in the present process. The critical temperature of carbon dioxide is about 31° C., and its critical pressure is about 1071 psi. Critical data for other gases can be readily determined from the literature or experimentally by those skilled in the art. For example, the critical point of methane is about −82° C. and about 673 psig, that of ethane is about 32° C. and about 713 psig, that of propane is at about 97° C. and about 617 psig, and that of propylene is at about 92° C. and about 667 psig.

DETAILED DESCRIPTION OF THE PROCESS

Figure 3:
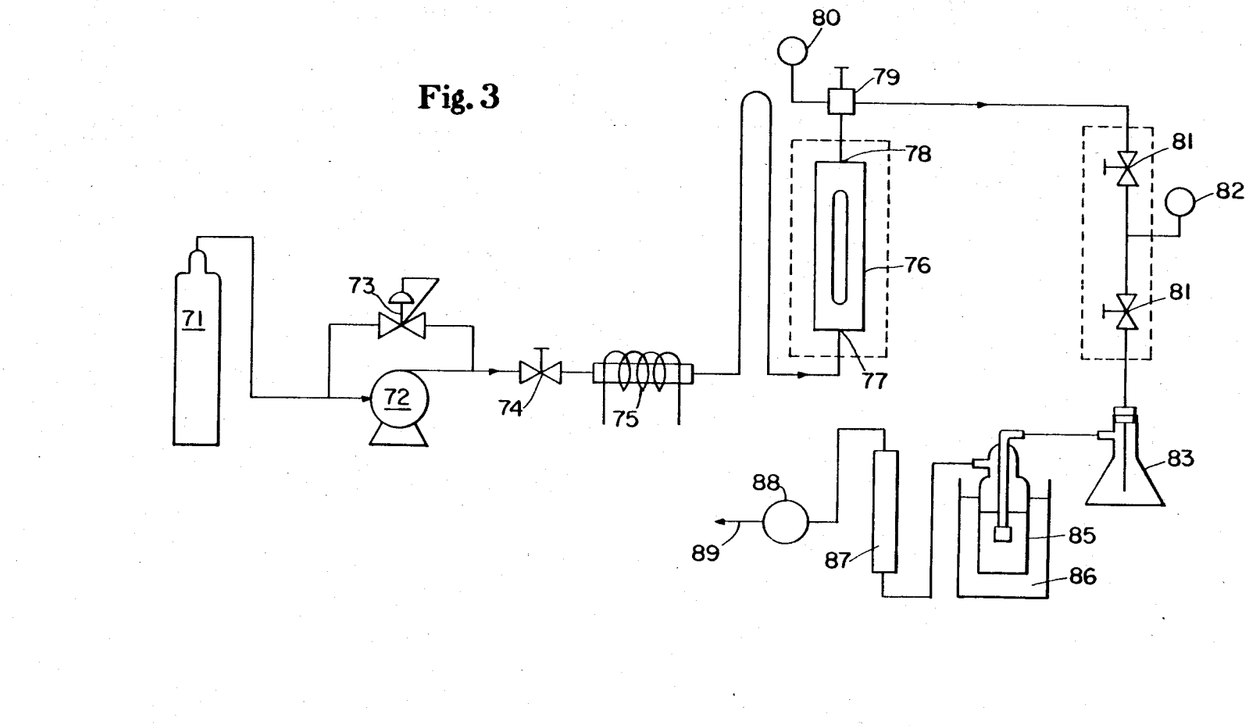
FIG. 3 is a flow chart of a simple one-stage batch extraction system.

FIG. 3 illustrates a simple batch extraction system. A bottled gas (carbon dioxide) supply 71 is connected through a gas line to a compressor 72. The compressor is equipped with a back pressure regulator 73, so that a constant supply of gas at a predetermined pressure is available. A gas line having an on/off valve 74 and wrapped in electrical heating tape 75 connects the compressor to the inlet of an extraction vessel 76. The electrical heating tape is used to preheat the gas. The extraction vessel consists of a Jerguson Liquid Level Gauge, Model 17-T-40 (basically a tube about $13\frac{3}{4}''$ long wih about a $\frac{1}{2}''$ inner diameter), manufactured by Jerguson Gauge & Valve Co., Burlington, Mass. The extraction vessel has an inlet 77 at one end and an outlet 78 at the other end. A gas line from the extraction vessel outlet is connected to a thermocouple 79 with a pressure gauge 80, and then to two expansion valves 81 in series with a pressure gauge 82 between the valves. The expansion valves are set to lower to atmospheric pressure the gas flowing through. An Ehrlenmeyer flask 83 is attached below the expansion valves. Because of the drop in pressure and temperature after the expansion valves, compounds extracted by the gas are separated from the gas and collected in the Ehrlenmeyer flask. Gas flows from the outlet of the flask through a gas bubbler 85 containing freon 11 sitting in a dry ice/acetone trap 86, then through a flow meter 87 and a dry test meter 88, and finally to a vent 89. The dry test meter measures total gas flow over a period of time.

The orange material to be extracted is placed into the extraction vessel, and the vessel is closed. The extraction vessel and the gas line leading to it are preheated to the desired temperature. Gas (carbon dioxide in this case) flow is started by opening the on/off valve between the compressor and the extraction vessel. The compressor and the back pressure regulator are adjusted to the desired pressure. The gas flow through the extraction system is measured by the flow meter in liters per minute at ambient conditions and by the dry test meter in liters of gas at ambient conditions.

Figure 4:
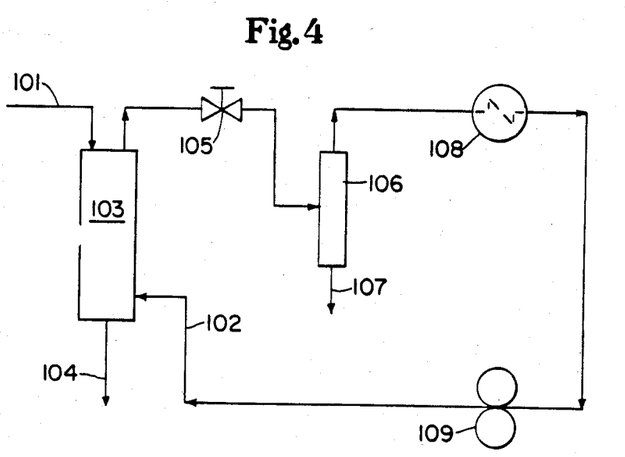
FIG. 4 is a flow chart of a continuous countercurrent single section extraction system.

FIG. 4 is a flow chart of a continuous extraction system having a single extractor section. In general, the continuous process comprises the steps of: (a) continuously flowing a solvent gas into an extractor maintained at a temperature between the critical temperature of the gas and about 100° C. (212° F.), and at a reduced pressure between about 0.56 and about 1.31, to extract flavor and aroma compounds the majority of which have a molecular weight less than or equal to that of limonene; (b) continuously flowing organic orange flavor and aroma compounds into the extractor, the solvent to feed ratio being from about 5:1 to about 100:1; (c) continuously withdrawing extract phase (solvent gas with dissolved compounds) from the extractor; and (d) continuously flowing said extract phase into a separator wherein the solvent gas and dissolved compounds are separated.

In FIG. 4, a source of organic orange flavor and aroma compounds 101, e.g. essence oil, is connected to an extractor 103. Recycled solvent gas 102 flows through the extractor. The solvent gas extracts volatile compounds from the essence oil and then exits the extractor. The residual essence oil remaining after extraction, the raffinate, flows out of the bottom of the extractor (as indicated by numeral 104 in the figure). Solvent gas with its extracted volatile compounds flows through a pressure reduction device 105 to a separator 106. Under the conditions of reduced pressure the extracted compounds are not soluble in the solvent gas, and they settle in the bottom of the separator. This extract 107 is reduced in pressure to atmospheric pressure and collected for later use. The solvent gas flows from the separator to a condensor 108 where it is liquefied. Then it flows through a pump 109 where the pressure of the gas is increased to extraction pressure. Optionally a compressor can be employed before the condensor to provide a portion of the repressurization. The gas is recycled to the extractor for extraction of fresh essence oil.

The extractor in the continuous system is generally an extraction column. A typical extraction column consists of an 8-foot long pipe with a $1\frac{1}{2}$-inch inner diameter. The column contains packing material to provide sufficient interface between the essence oil and the solvent gas. A 5-foot length of low density packing material filling the inside of the extraction column is sufficient. An example of suitable packing material is Goodloe packing, manufactured by Koch Engineering Company, Wichita, Kans. Open sections in the top and bottom of the packing material are left for oil disengagement and oil surge, respectively. Typically, feed oil enters about 20 inches above the bottom of the packing material, although sometimes the feed oil enters just above the full five feet of packing. For cases where no reflux is used and the feed oil enters at the lower point, the top portion of the packing is then inoperative with respect to mass transfer and serves only to disengage oil mist carried overhead.

Typically, the solvent gas enters the extraction column just below the bottom of the packing material and flows upward at a rate of 50 lbs./hour (4000 lbs./hr./ft.$^2$ packing). The oil feed rate varies between about 1 and about 4 lbs./hour (80–320 lbs./hr./ft.² packing). With carbon dioxide as the solvent gas at about 50° C. and about 1000 psig, about ¼ lb. of extract per hour is produced. Under these conditions for the extraction of orange essence oil, the low molecular weight volatile compounds are increased in concentration several times. For example, ethyl butyrate in the feed oil at a concentration of about 0.2% is increased in concentration in the extract to about 0.9%. Simultaneously, ethanol is boosted in concentration about ten times, while the undesirable high molecular weight volatile decanal is decreased in the extract to about one-fifth of its concentration in the feed oil. The concentration of limonene in the extract remains about the same as in the feed oil.

The essence oil feed rates can be varied to improve recovery of the low molecular weight volatiles. For example, at 3 lbs./hr. of feed oil the concentration of ethyl butyrate in the raffinate is about 0.125%, while at 1.5 lbs./hr. of feed oil the concentration of ethyl butyrate in the raffinate is about 0.06%.

The pressure reduction device 105 can be a simple throttling valve. When carbon dioxide is used as the solvent gas its pressure is reduced to between about 150 psig and 350 psig. Under these conditions the extract is insoluble in the carbon dioxide and it collects in the bottom of the separator. The carbon dioxide is condensed, pumped to extraction pressure, and recycled to the extractor.

Figure 5:
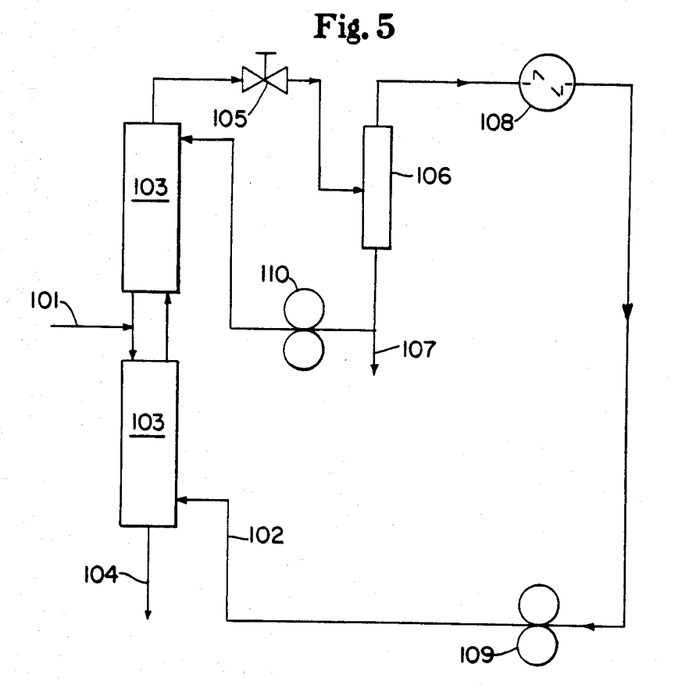
FIG. 5 is a flow chart of a continuous countercurrent extraction system with two extractors and provision for reflux.

FIG. 5 illustrates a two-section extraction system with reflux capability. A source of essence oil 101 is connected between two extractors 103, an upper extractor section and a lower extractor section. The two extractor sections are connected for solvent gas flow upward and oil flow downward. Recycled solvent gas 102 enters the lower extractor. Solvent gas with extracted volatile compounds exits the top of the sections, while the residual oil, raffinate, exits the bottom of the sections. Typically the extractor sections comprise columns as described for the single-stage continuous system. As understood by one skilled in the art, a two-stage extraction system will achieve a greater concentration of the desirable volatiles than will a single-stage system. Any number of stages may be used.

The remainder of the two-section system is as described for the single-section system. The solvent gas with its extracted compounds flows through a pressure reduction device 105 to a separator 106. Extract 107 exits the separator, and the gas is recycled through a condensor 108 and a pump 109 for reuse in extracting fresh essence oil.

After leaving the extraction columns, usually about 50% to about 75% of the extract after separation from the solvent gas is refluxed by return to the upper extractor section via a reflux pump 110. Refluxing displaces from the gas phase the heavier (higher molecular weight) compounds in the upper extractor section and returns them as an oil to the bottom extractor section. The resulting extract then will be rich in only the desirable lighter compounds having molecular weights equal to or less than limonene. Using reflux, ethyl butyrate, for example, can be boosted to 10 to 20 times its concentration in the feed oil. With typical ethyl butyrate levels of 0.1% to 0.2% in the feed oil, it is possible to achieve a concentration of 2% to 3% or more in the final extract.

The lower the molecular weight of a compound, the more its concentration increases in the first extraction. This extraction serves to increase the overall concentration of desirable fresh flavor and aroma compounds and decrease the overall concentration of the undesirable compounds.

The remaining undissolved compounds from the first extraction are then subjected to a second extraction to extract additional flavor and aroma compounds, the majority of which have a molecular weight and/or G.C. retention time greater than or equal to that of limonene but less than that of valencene. These compounds are primarily the oxidation products of the lipids in the orange juice and other higher molecular weight compounds of the peel.

The remaining undissolved compounds from this second extraction are then subjected to a third extraction to extract primarily valencene. The extracts from the first and third extractions can be used alone as orange flavor and aroma compositions, but preferably the first extract (concentrated in compounds having a retention time less than or equal to that of limonene) is added to the third extract (concentrated in valencene) to produce a highly preferred orange flavor and aroma composition.

The extraction described above produces compositions in which the relative concentration of the compounds having a G.C. retention time or molecular weight less than or equal to that of limonene is increased, and the concentration of compounds having a G.C. retention time or molecular weight greater than or equal to that of limonene is decreased. Preferably, extraction time and conditions will be such that the compounds wih molecular weights or G.C. retention times less than or equal to that of limonene will be twice as concentrated in the final product as in the starting material. More preferably, the concentration of these compounds will be at least 8 times their concentration in the starting material, and most preferably they will increase in concentration by at least 15 times. Preferably, the compounds having molecular weight greater than or equal to that of limonene but less than that of valencene will be reduced in concentration in the final product to less than half their concentration in the starting oil. More preferably, they will be reduced in concentration to less than one-sixth their concentration in the starting oil, and most preferably they will be reduced to less than one-tenth their original concentration.

QUANTITATIVE ANALYSIS OF ORANGE OIL ESSENCE BY CAPILLARY COLUMN GAS CHROMATOGRAPH

This method provides an analysis of oil essences by direct injection into a capillary column gas chromatograph and processing of the raw data by a data system which automatically calculates the weight % of calibrated components. An internal standard, cyclohexanone, is used to calculate relative response factors. The percent area purity of compounds assayed was used to establish the amount of the respective compounds actually used in order to calculate their detection response factors. (See Table 2.) This procedure does not need an adjustment to compensate for the non-volatile components in oil essence because each component is calibrated individually. This method is good only for orange oil mixtures such as that produced by the extraction herein. It is also applicable to cold pressed orange oils, stripper oils, commercial orange oil essences, and raffinates.

Instrumental Procedure

A. Instrumentation

A Hewlett Packard 5880A G.C. with capillary column injector and a model 7671A automatic liquid sample injector is used. The instrument is equipped with a Level 4 data terminal. For quantitation the analog signal was presented to a Nelson Analytical Instruments Model 4416 chromatography data system for processing of raw detector data and calculation of the results as wt %.

B. Instrument Conditions

Air: 250 ml/min.
Hydrogen: 30 ml/min.
Helium: 3 ml/min. (36.5 cm/sec)
Splitflow: 80:1 column flow
Septum purge: 3 ml/min.
Injection volume: 2 ul
DB5 fused silica capillary column (0.32 mm×30 m, 1 um film thickness, J & W Scientific)

C. Temperature Profile

The oven is equilibrated for one minute at the initial temperature before injection. Initial oven temperature is 40° C. for 10 minutes. The oven is then programmed to rise at 2.00° C./min. to a final temperature of 140° C. The program rate is then changed to have the oven rise 6.00° C./min. to a final temperature of 260° C. and held there for 20 minutes.

Analytical Sample Preparation

For the preparation of samples use positive displacement pipettes. Transfer 250 ul of oil sample and 250 ul of internal standard solution into a 2 ml autosampler vial and crimp cap. Vortex mixture for 15 seconds and load into autosampler. Program autosampler to wash syringe with ethanol after each injection. Initiate analysis sequence and obtain results.

A. Internal Standard Solution

Add a small volume 10–20 ml of ethanol into a 100 ml volumetric flask and spike in 250 ul of cyclohexanone. Take to volume with ethanol and mix thoroughly. Store this solution at −25° C. between uses. The resulting concentration is 2.35 mg/ml of cyclohexanone in ethanol.

B. Calibration of Instrument

Add 250 ul of calibration mixture and 250 ul of internal standard solution into a 2 ml crimp capped vial. Use positive displacement pipettes. Mix by vortexing for 15 seconds and then inject 2 ul of calibration mixture. After chromatogram (calibration mixture run) is completed, check for proper identification of peaks and retention times.

TABLE 2

Standard Solution Calibration Table

| Peak | Mg/ml | Ret. Time (Minutes) | Amount/Area (Response Factor × $10^{-4}$) | Compound Name |
|---|---|---|---|---|
| 1 | 2.79 | 3.62 | 1.69 | Ethyl Acetate |
| 2 | 2.85 | 6.99 | 1.48 | Ethyl Propionate |
| 3 | 2.64 | 7.58 | 1.37 | Methylbutyrate |
| 4 | 2.69 | 13.42 | 2.39 | Hexanal |
| 5 | 2.77 | 13.67 | 1.35 | Ethylbutyrate |
| 6 | 2.44 | 18.12 | 1.26 | Ethyl 3-Methylbutyrate |
| 7 | 2.34 | 18.27 | 1.47 | t-2-Hexanal |
| 8 | 2.75 | 25.56 | 0.92 | Alpha-Pinene |
| 9 | 2.70 | 29.55 | 0.93 | Beta-Pinene |
| 10 | 1.43 | 30.91 | 1.35 | Myrcene |
| 11 | 2.64 | 32.10 | 1.19 | Octanal |
| 12 | 624.30 | 35.00 | 0.98 | Limonene |
| 13 | 1.42 | 37.02 | 0.60 | Gamma-Terpinene |
| 14 | 2.31 | 38.00 | 1.22 | Octanol |

TABLE 2-continued

Standard Solution Calibration Table

| Peak | Mg/ml | Ret. Time (Minutes) | Amount/Area (Response Factor × $10^{-4}$) | Compound Name |
|---|---|---|---|---|
| 15 | 2.58 | 40.55 | 1.22 | Linalool |
| 16 | 2.66 | 40.70 | 1.35 | Nonanal |
| 17 | 2.20 | 44.64 | 1.35 | Citronellal |
| 18 | 1.37 | 47.68 | 1.17 | Alpha-Terpineol |
| 19 | 1.22 | 48.69 | 6.04 | Decanal |
| 20 | 2.34 | 51.50 | 1.24 | Neral |
| 21 | 2.69 | 51.82 | 1.31 | d-Carvone |
| 22 | 1.49 | 52.40 | 1.42 | Geraniol |
| 23 | 1.96 | 53.70 | 1.31 | Geranial |
| 24 | 2.38 | 54.11 | 1.61 | Perillaldehyde |
| 25 | 2.60 | 62.74 | 1.85 | Dodecanal |
| 26 | 2.46 | 63.60 | 1.03 | Caryophyllene |
| 27 | 1.66 | 66.60 | 1.06 | Valencene |
| 28 | 1.97 | 75.00 | 1.35 | Nootkatone |

Calculations:
Weight % of Component =

$$\left[ \frac{(Area_x)(Slope_x) + (Intercept_x) \times Conc.\ I.S.}{(Area_{I.S.})(Slope_{I.S.}) + (Intercept_{I.S.})} \right] \times \frac{Dilution\ FActor}{Sample\ Weight} \times 100$$

EXAMPLE 1

An orange flavor and aroma composition was made by the extraction of orange essence oil by carbon dioxide using the batch extraction system illustrated in FIG. 3 and described in the specification. Twenty grams of an early/mid season orange essence oil collected at a Taste evaporator was placed into the extraction vessel. The oil was extracted by 800 liters (1440 g) of carbon dioxide at a pressure of 900 psig and a temperature of 40° C. (104° F.). The weight ratio of carbon dioxide to oil was 72:1. The flavor and aroma composition obtained from the extraction (i.e., the extract) was analyzed for key components by the gas chromatography method described herein and compared with the composition of the starting (feed) oil, as follows:

| Component Composition | Feed Oil (Weight %) | Extract (Weight %) | Ratio of Extract Concentration to Feed Oil Concentration |
|---|---|---|---|
| Ethyl Butyrate | 0.179 | 0.627 | 3.5 |
| Hexanal | 0.090 | 0.264 | 2.9 |
| Limonene | 89.928 | 91.466 | 1.0 |
| Decanal | 1.733 | 0.478 | 0.3 |
| Valencene | 1.745 | 0.059 | 0.03 |

It is seen that the concentration of the desirable lower molecular weight compounds ethyl butyrate and hexanal is greatly increased after the extraction. The concentration of limonene stays about the same, and the concentration of the higher molecular weight compounds decreases. The lower molecular weight compounds are more readily extracted in the solvent gas, thus their concentration increases. A plot of log (extract concentration/feed oil concentration) versus retention time on a nonpolar DB-5 gas chromatography column showed that the concentrations approximately follow straight line behavior.

EXAMPLE 2

The extract obtained in Example 1 was added to an orange juice base and compared with an orange juice containing a commercial essence oil. Compared to the commercial essence oil, the Example 1 extract had a higher concentration of the low molecular weight compounds (less than limonene) and a lower concentration of the high molecular weight compounds. The formulas are shown below.

| Juice Base Formula | Juice Containing Example 1 Extract, Weight % | Juice Containing Commercial Essence Oil, Weight % |
|---|---|---|
| Taste Concentrate of Valencia and Early/Mid Oranges | 63.22% | 62.40% |
| Essence Concentrate | 4.50% | 4.50% |
| Aqueous Essence (Aroma) | 0.30% | 0.30% |
| Pulp | 5.90% | 5.90% |
| Water | 26.08% | 26.90% |
| Total % | 100.00% | 100.00% |
| Oil Added | | |
| Example 1 Extract | 0.013% | — |
| Commercial Essence Oil | — | 0.014% |

The two juices were judged in taste tests by 210 consumer panelists. The juice containing Example 1 extract was preferred for overall flavor 60/40 over the juice containing commercial essence.

EXAMPLE 3

A bench scale extraction system as described in Example 1 was used to extract twenty grams of orange essence oil. The extraction was conducted at 40° C. (104° F.) and 1000 psig. Carbon dioxide was pumped through the extraction vessel at the rate of 10 standard liters per minute. After 800 liters of carbon dioxide were flowed through the oil sample, 2400 more standard liters of carbon dioxide were flowed through the sample. The first 800 liters yielded a composition shown below as Extract 1. The second carbon dioxide charge yielded a composition shown below as Extract 2, and the residue was saved as a high valencene residue, shown below.

| | Compositions in Weight Percent | | | |
|---|---|---|---|---|
| | Feed weight % | Extract 1 weight % | Extract 2 weight % | Residue weight % |
| Ethanol | 0.11 | 0 | 0 | 0.014 |
| Ethyl Butyrate | 0.18 | 0.538 | 0.055 | 0 |
| Hexanal | 0.035 | 0.095 | 0.018 | 0 |
| Limonene | 79.17 | 81.78 | 79.31 | 62.67 |
| Decanal | 0.765 | 0.233 | 0.429 | 3.54 |
| Valencene | 1.192 | 0.090 | 0.265 | 10.24 |

| | Enrichment or Folding Ratios | | |
|---|---|---|---|
| Component | Extract 1 | Extract 2 | Residue |
| Ethanol | 0 | 0 | N/A |
| Ethyl Butyrate | 2.9 | 0.3 | N/A |
| Hexanal | 2.7 | 0.5 | N/A |
| Limonene | 1.0 | 1.0 | 0.8 |
| Decanal | 0.3 | 0.6 | 4.6 |
| Valencene | 0.1 | 0.2 | 8.6 |

This example illustrates that the second extraction produces primarily a limonene solution of the higher aldehydes, e.g. decanal and hexanal without the good flavor contributors, either the low molecular "fresh flavorants" or the high molecular weight material as valencene.

EXAMPLE 4

A continuous extraction system as illustrated in FIG. 4 and described in the specification was used to extract orange essence oil. The system was operated without reflux. An 8 foot extraction column was used. Extraction conditions were 40° C. (104° F.) and 1000 psig. Essence oil was continuously pumped into the extraction vessel at the rate of 3.5–4.0 lbs./hour. At the same time, carbon dioxide at 40° C. (104° F.) and 1000 psig was continuously pumped into the extraction vessel at the rate of 40–50 lbs./hour. The solvent to feed ratio is 14:1. After one hour of extraction, 0.25 lbs. of extract was obtained. The compositions of the feed oil and the extract were analyzed and found to be as follows:

| Compound Composition | Feed Oil (weight %) | Extract (weight %) | Ratio of Extract Concentration to Feed Oil Concentration |
|---|---|---|---|
| Ethanol | 0.100 | 0.836 | 8.4 |
| Ethyl Butyrate | 0.200 | 0.921 | 4.6 |
| Hexanal | 0.040 | 0.161 | 4.0 |
| Limonene | 93.946 | 94.968 | 1.0 |
| Decanal | 0.900 | 0.255 | 0.3 |
| Valencene | 1.746 | 0.008 | 0.004 |

The desirable light compounds (ethanol, ethyl butyrate, and hexanal) were boosted in concentration in the extract compared to the feed oil, while the heavy compounds (decanal and valencene) were lowered in concentration.

EXAMPLE 5

An extraction was conducted as in Example 4, except that reflux was used with the system. The extract obtained at a rate of 0.25 lbs./hour was split in two, and 0.125 lbs. were refluxed into the extraction column. This is a 50% reflux. The following results were obtained:

| Compound Composition | Feed Oil (weight %) | Extract (weight %) | Ratio of Extract Concentration to Feed Oil Concentration |
|---|---|---|---|
| Ethanol | 0.050 | 1.078 | 21.6 |
| Ethyl Butyrate | 0.043 | 0.420 | 9.8 |
| Hexanal | 0.012 | 0.126 | 10.5 |
| Limonene | 90.988 | 89.271 | 0.98 |
| Decanal | 1.376 | 0.243 | 0.18 |
| Valencene | 2.07 | 0.000 | 0.00 |

Compared to Example 4, the use of reflux further concentrated the desirable light compounds and further lowered the concentration of the heavy compounds.

EXAMPLE 6

The residual oil (raffinate) from an extraction performed as in Example 4 was charged into the extraction column of the continuous system (no reflux) described in Example 4. This residue was extracted with carbon dioxide at 1000 psig and 50° C. (122° F.). The flow rate of the feed oil was varied from 0.4 to 1.2 lbs./hour, and the carbon dioxide flow rate was 50 lbs./hour.

The raffinate from this extraction was continuously collected and recycled to the feed tank leading to the extraction column, from which it was again sent through the column. Fractions of extract were collected after 22.5 hours, 49 hours, and 72.5 hours denoted below as Extracts 1, 2, and 3, respectively. Compositions were as follows:

| Component | Composition in Weight Percent | | | |
| --- | --- | --- | --- | --- |
| | Feed weight % | Extract 1 weight % | Extract 2 weight % | Extract 3 weight % |
| Ethanol | 0 | 0 | 0 | 0 |
| Ethyl Butyrate | 0.03 | 0.01 | 0 | 0 |
| Hexanal | 0 | 0 | 0 | 0 |
| Limonene | 93.3 | 92.9 | 89.2 | 85.1 |
| Decanal | 1.46 | 1.65 | 2.25 | 4.25 |
| Valencene | 2.15 | 2.75 | 4.18 | 9.67 |

What is claimed is

1. A concentrated orange flavor and aroma composition comprising a natural orange essence oil extract containing organic flavor and aroma compounds, wherein at least three of said compounds are selected from the group consisting of ethyl butyrate, decanal, limonene, and valencene, and wherein at least about 0.50% of the composition is ethyl butyrate, less than about 0.35% of the composition is decanal, at least about 5% of the composition is valencene, and wherein the composition has an ethyl butyrate to limonene ratio of from about 1:10 to about 1:100, and wherein the extract is prepared by a process comprising the steps of:

(a) contacting natural orange essence oil with a solvent gas having a temperature between its critical temperature and about 100° C., and having a reduced pressure between about 0.56 and about 1.31 (where reduced pressure is defined as the extraction pressure of the solvent gas divided by its critical pressure), to extract flavor and aroma compounds the majority of which have a molecular weight less than or equal to that of limonene;

(b) separating the solvent gas and dissolved compounds from the remaining undissolved compounds; and (c) separating the dissolved compounds from the solvent gas.

2. A composition according to claim 1 wherein at least about 0.65% of the composition is ethyl butyrate.

3. A composition according to claim 1 wherein less than about 0.30% of the composition is decanal.

4. A composition according to claim 1 wherein said composition has an ethyl butyrate to limonene ratio of from about 1:30 to about 1:100.

5. A composition according to claim 1 which contains valencene at a level of at least about 10% of said composition.

6. An orange juice concentrate having a solids content of at least about 35% comprising, on a weight basis of juice reconstituted to 12% solids, from about 0.004% to about 0.016% of the composition of claim 1 and from about 0.0008% to about 0.0015% acetaldehyde.

7. An orange juice concentrate having a solids content of at least about 35% comprising, on a weight basis of juice reconstituted to 12% solids, from about 0.004% to about 0.016% of the composition of claim 1 and from about 0.0010% to about 0.0012% acetaldehyde.

8. An orange juice concentrate having a solids content of from about 35% to about 65% comprising, on a weight basis of juice reconstituted to 12% solids, from about 0.004% to about 0.016% of the composition of claim 1.

* * * * *

UNITED STATES PATENT AND TRADEMARK OFFICE
CERTIFICATE OF CORRECTION

PATENT NO. : 4,693,905
DATED : September 15, 1987
INVENTOR(S) : Cornelis H. Japikse et al.

It is certified that error appears in the above-identified patent and that said Letters Patent are hereby corrected as shown below:

On the title page and at the top of Column 1, in the title the word "ORGANCE" should read -- ORANGE -- .

At Column 4, line 67, the word "that" should read -- the -- .

In Table 1 at Columns 7 and 8, in the line for B-Caryophyllene, the number "66.6" should read -- 63.6 --, and the word "Juice" should read -- Peel -- .

At column 11, line 60, the number "11" in "freon 11" should be in regular type, not bold type.

Signed and Sealed this

Ninth Day of February, 1988

Attest:

DONALD J. QUIGG

Attesting Officer

Commissioner of Patents and Trademarks